US012189350B2

(12) United States Patent
Maitra et al.

(10) Patent No.: US 12,189,350 B2
(45) Date of Patent: Jan. 7, 2025

(54) AGING AWARE REWARD CONSTRUCT FOR MACHINE TEACHING

(71) Applicant: MICROSOFT TECHNOLOGY LICENSING, LLC, Redmond, WA (US)

(72) Inventors: Kingsuk Maitra, Fremont, CA (US); Kence Anderson, Berkeley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 347 days.

(21) Appl. No.: 17/694,593

(22) Filed: Mar. 14, 2022

(65) Prior Publication Data

US 2023/0288882 A1    Sep. 14, 2023

(51) Int. Cl.
*G05B 13/02*    (2006.01)
*G05B 13/04*    (2006.01)

(52) U.S. Cl.
CPC ......... *G05B 13/0265* (2013.01); *G05B 13/04* (2013.01)

(58) Field of Classification Search
CPC .... G05B 13/0265; G05B 13/04; G05B 15/02; G05B 17/02; G05B 23/0283; G05B 23/0286; G05B 23/0297
USPC .......................................................... 700/29
See application file for complete search history.

(56) References Cited

U.S. PATENT DOCUMENTS 8,417,360 B2 * 4/2013 Sustaeta ............... H04L 67/125
                                                                          700/28
11,231,703 B2 * 1/2022 Zhang .................... G06N 3/044

2017/0364043 A1 * 12/2017 Ganti ..................... G05B 17/02
2019/0384257 A1 * 12/2019 Zhang .................... G06F 11/008
2020/0301408 A1 *  9/2020 Elbsat .................... G06N 3/04
2021/0003974 A1 *  1/2021 Yang ..................... G05B 13/027

FOREIGN PATENT DOCUMENTS

WO    WO-2005054968 A1 *  6/2005    ......... G05B 19/4184
WO    WO-2010011918 A2 *  1/2010    ......... G05B 23/0254

OTHER PUBLICATIONS

"International Search Report and Written Opinion Issued in PCT Application No. PCT/US23/012056", Mailed Date: May 25, 2023, 11 Pages.

* cited by examiner

*Primary Examiner* — Ronald D Hartman, Jr.
(74) *Attorney, Agent, or Firm* — Newport IP, LLC; Jacob P. Rohwer

(57) ABSTRACT

The techniques disclosed herein enable systems to integrate aging awareness into machine learning agents for management of control systems. To achieve this, the machine learning agent extracts a set of states and an aging model from the control system and derives an aging term from the aging model. Based on the states and the aging term, the machine learning agent determines a set of actions that are applied to the control system. Subsequently, the machine learning agent can extract a new set of states to analyze the efficacy of the set of actions. This is achieved through an optimality function that quantifies the success of the set of actions by calculating an optimality score. The calculation is based on both a current performance of the system and a future drift or degradation of system components. Through many iterations of the action set, the machine learning agent can optimize system operations.

17 Claims, 10 Drawing Sheets

AGING AWARE REWARD CONSTRUCT FOR MACHINE TEACHING

BACKGROUND

As the scale and complexity of control systems has increased, various organizations have sought improvements in the field of autonomous platforms and autonomous control systems. In many examples, autonomous control systems relate to the control of machinery that is involved in a process such as chemical processing, semiconductor fabrication, and climate control. Autonomous control systems can also be applied to the context of computing platforms such as a datacenter that provides cloud computing services. Thanks to advances in autonomous control systems, many such processes in manufacturing, computing, and many other disciplines can realize benefits in product throughput, efficiency, and other aspects. This is thanks to reduced reliance on human oversight which can be inconsistent and prone to mistakes.

In recent times, many control systems have been further enhanced with advanced computing techniques such as machine learning and artificial intelligence. These approaches enable systems to not only maintain consistent throughput but even improve over time. In a specific example, an autonomous control system can be augmented by a reinforcement learning model, commonly referred to as an RL brain or RL agent. The reinforcement learning model can accordingly be configured with an objective or goal which is typically to optimize some aspect of the process. For instance, an operator of a manufacturing line may configure the reinforcement learning model to maximize product throughput. The reinforcement learning model can then modify various aspects of the manufacturing process such as the flow rate of raw materials or batch sizes. In doing so, the reinforcement learning model can iteratively learn a realistically optimal configuration of the manufacturing line to achieve the specified goal (e.g., maximum throughput). In contrast to an autonomous process control system, these systems can be referred to as autonomous platforms as the system is enabled to independently make decisions and adjust in real time.

However, while operators may realize significant improvements in efficiency or throughput through advanced computing techniques, many existing machine learning solutions for autonomous control systems can fail to account for additional factors. For instance, a control system may be deployed to manage a manufacturing line that comprises many pieces of machinery. Over time, the machinery can drift in functionality as a result of aging and natural wear and tear. In one example, a device responsible for etching semiconductors may become less precise over time. This can lead to unacceptable changes in final product characteristics such as heat generation. A machine learning agent that is focused solely on optimizing for product throughput may deem this a worthy tradeoff for reaching maximum throughput. Unfortunately, for particularly sensitive applications such as aerospace manufacturing, semiconductor fabrication, and medical devices, these consequences of aging can prove render products useless or even pose a threat to safety. In another example, a control system may manage a climate control system for a building. As the climate control equipment ages, the energy efficiency of the system may worsen leading to increased operating costs.

Accordingly, control system operators must account for aging or drift to ensure normal functionality especially in sensitive application such as those mentioned above. In typical solutions, operators can set specification limits that compensate for aging and drift in various components of a control system, this practice is also known as margining. For instance, a computing device manufacturer that is concerned with decreasing thermal efficiency as manufacturing equipment ages can select component sizes to accommodate a worst-case scenario. However, this static margining approach can lead to overcompensation as the severity of a worst-case scenario can be overestimated by the operator. Consequently, significantly more material may be used in the construction of the computing devices than is needed leading to inefficiency, waste, and increased costs. Thus, there is a need for machine learning approaches for autonomous control systems that minimizes the risk of overcompensation while maintaining control system performance.

It is with respect to these and other considerations that the disclosure made herein is presented.

SUMMARY

The techniques disclosed herein improve the functionality of control systems through the introduction of again awareness in the training of machine learning agents. Generally described, a control system can comprise one or more physical components that are controlled by the system. In a specific example, a control system can be a climate control system for a building that comprises various HVAC devices such as chillers. Over time, the performance of the chillers can naturally degrade or otherwise drift due to various extraneous factors such as aging machinery, cumulative noise, and other non-idealities associated with preventative maintenance and natural wear and tear. By applying a machine learning agent that is equipped with aging awareness, the climate control system can be enabled to account for this degradation and drift in chiller performance to ensure consistent functionality and even prolong the operating lifespan of the climate control system.

In various examples, an aging-aware machine learning agent can extract an aging model from the control system that defines one or more predicted operating conditions for a future point in time. For example, in the climate control system example mentioned above, the aging model can define the degradation in chiller performance over time. The aging model can be expressed as a closed form equation, a statistical model, or any other suitable format.

Based on the aging model, the machine learning agent can derive an aging term that quantifies the predicted operating conditions in a way that is compatible with the machine learning agent. As will be elaborated upon below, the aging term can be used to form an aging aware reward construct that enables the machine learning agent to account for aging and drift in control system components. Along with the aging model, the machine learning agent can extract a set of states from the control system. The states can define various characteristics of the control system such as settings for the components and current operating conditions in a format that can be ingested by the machine learning agent.

The machine learning agent can analyze the states as well as the aging term to determine a set of actions that are applied to the control system. As mentioned above, by including the aging term in the decision-making process, the machine learning agent can select actions that are realistically optimal at the present time as well as future changes in the performance of the control system. In various examples, actions can be anything that changes or modifies a characteristic of the control system. For example, in a manufacturing context, an action may be to adjust the flow rate of raw material into the manufacturing line.

In typical solutions, a machine learning agent that is not aging aware may select actions that extract maximum performance from the control system at the present time without consideration for the associated wear and tear on the control system components. As such, performance of the control system at a future point in time may suffer as a result due to accelerated aging or drift caused by the initial set of actions. In contrast, an aging aware machine learning agent may still elect to improve performance at the present time while leaving additional performance unrealized until a later time. In this way, the control system can accrue performance over time and maintain a consistent level of performance for a longer period of time.

In response to applying the set of actions to the control system, the various states of the control system will accordingly change. The machine learning agent can extract the set of changed states from the control system. As mentioned above, the machine learning agent may be equipped with an aging aware reward construct that can enable the machine learning agent to quantify the efficacy of a set of actions that considers the changed states as well as the aging term. This can be represented by an optimality score, oftentimes referred to in the context of reinforcement learning as a reward and is calculated by a reward function.

Based on the optimality score and the changed states, the machine learning agent can determine a new or modified set of actions to apply to the control system to increase the optimality score. The process of determining, applying, and scoring a set of actions represents one iteration of training for the machine learning agent. Through many iterations both in a simulator as well as in live deployment, the machine learning agent can determine a realistically optimal set of actions to balance the performance of the control system with consideration for the aging and drift of control system components.

By integrating aging awareness into machine learning agents for control systems, operators can realize improved performance and efficiency as the machine learning agent learns actions that may not have been considered by existing solutions or human operators. In this way, the operating costs of various control systems can be greatly reduced. In addition, by considering the aging of control system components, the disclosed system can prolong equipment lifespan further reducing operating costs and downtime related to preventative and/or emergency maintenance. Furthermore, by dynamically margining the optimality score, the disclosed system can eliminate static margining, thereby reducing waste in a diverse set of contexts. In addition, since the machine learning agent is configured to quantify a level of performance for the control system, operators can guarantee well-defined behaviors and performance levels for a predetermined time period.

In another example of the technical benefit of the present disclosure, the disclosed techniques can streamline the operation of existing control systems by providing a well-defined and adjustable retraining schedule. Oftentimes, a machine learning agent requires periodic retraining to ensure optimal performance and functionality. By considering the aging profile of a control system, the disclosed techniques enable machine learning agents to adjust retraining schedules to synchronize with the preventative maintenance schedule of control system components. In this way, downtime associated with regular maintenance can be further minimized as both the machine learning agent and control system can receive maintenance simultaneously.

In still another technical benefit of the disclosed system, the techniques described herein can enable access to advanced control systems for non-technical users. For example, while the aging aware reward construct can be represented mathematically, (e.g., as an equation) the system may also be configured to receive a goal statement in a natural language format. For instance, an operator may state that a climate control system is to achieve an efficiency of 0.8 kilowatt per ton for a duration of four years. The disclosed system can be configured to parse the goal statement to extract the various parameters of the reward construct (e.g., the efficiency and duration). In this way, the experience of configuring an autonomous control system requires little technical expertise and is thus highly accessible for many users.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for enhancing the autonomous control systems through the introduction of aging awareness in machine learning agents. As mentioned above, the machine learning agent can be configured to extract information from a control system such as a set of states and an aging model the various constituent components. Based on the states and the aging term that is derived from the aging mode, the machine learning agent can construct a set of actions to apply to the control system. It should be understood that an autonomous platform or autonomous system as discussed herein differs from an automated system in that an autonomous platform can be enabled to make decisions based on information extracted from the environment. In contrast, an automated system merely executes predetermined instructions and is not enabled to make decisions independently.

The disclosed system addresses several technical challenges associated with autonomous platforms and enabling aging awareness for control systems. For example, some existing autonomous platforms can be limited to optimizing individual aspects of a process such as product throughput of a manufacturing line or efficiency of a computing system. As such, these solutions may make decisions that are counterproductive to the overall goal of the process. For instance, an autonomous platform may increase the flow rate of raw material in a manufacturing line to maximize product throughput. However, this decision may lead to increased strain on the components of the control system. This outcome can be undesirable as accelerating the aging of components can lead to unexpected failures in the control system and disruption to normal operations. In contrast, the disclosed system can integrate aging or drift of the control system to discover a realistically optimal configuration that balances present performance with future drift and/or degradation of the control system.

Various examples, scenarios, and aspects that enable quality aware machine learning in autonomous platforms, are described below with reference to FIGS. 1A-7.

Figure 1A:
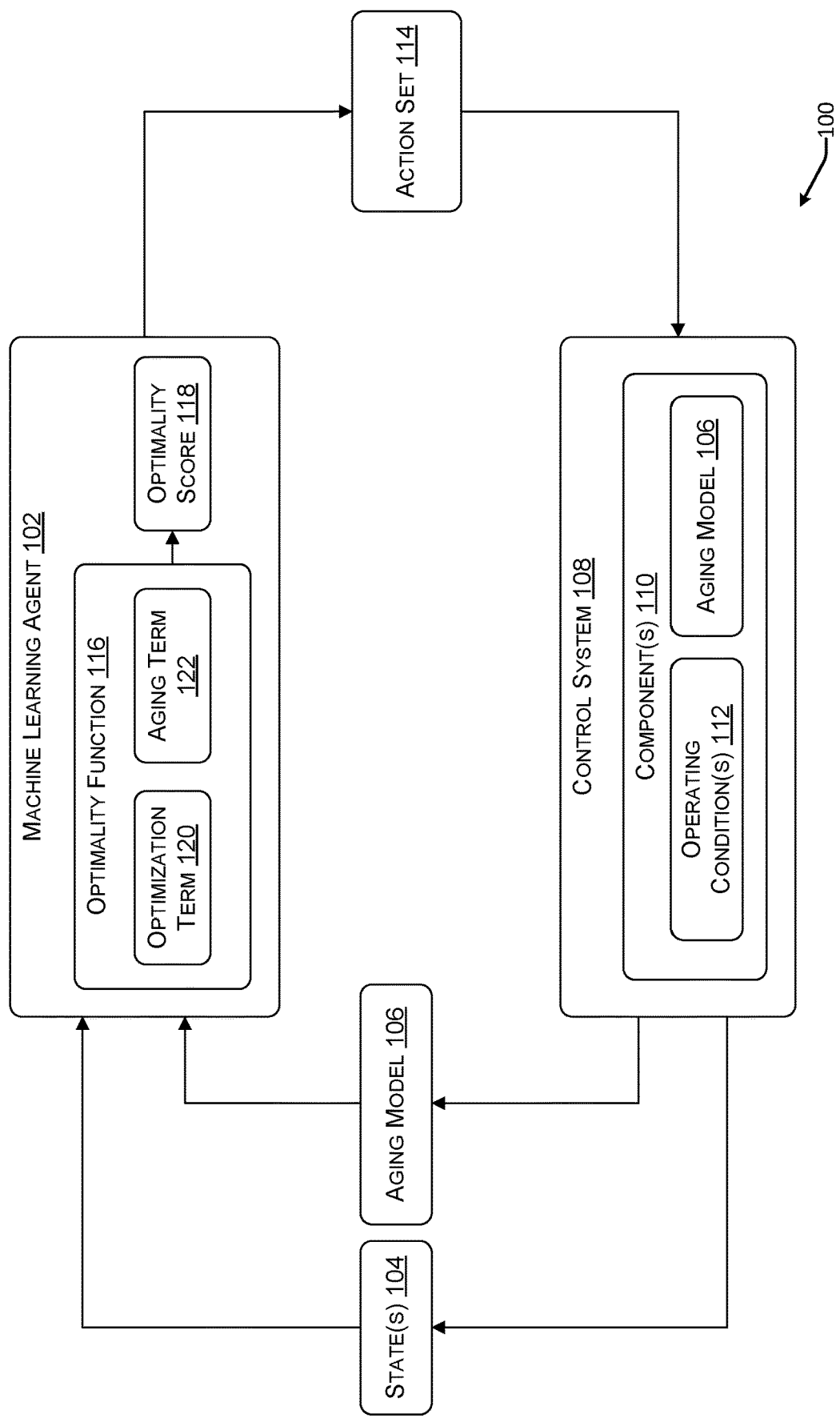
FIG. 1A is a block diagram of a system for deploying an aging aware machine learning agent to manage a control system.

FIG. 1A illustrates an example system 100 in which a machine learning agent 102 extracts a set of states 104 as well as an aging model 106 from a control system 108. As mentioned briefly above, the aging model 106 may be associated one or several components 110 of the control system 108 and can define predicted operating conditions for a future point in time. The predicted operating conditions may differ from the current operating conditions 112. For example, a future efficiency of a component predicted by the aging model 106 may be lower than a current efficiency due to age related degradation. In various examples, the aging model 106 can be a statistical model such as a power law, a Weibull distribution, or an exponential decay model. However, the aging model 106 can be any suitable representation of aging or drift.

By analyzing the aging model in addition to the set of states 104, the machine learning agent 102 can determine an action set 114 that is applied to the control system 108. The action set 114 can define one or more modifications to characteristics of the control system 108 or components 110. In one example, an action defined by the action set 114 may change the temperature setting of a chiller in a climate control system. It should be understood that the action set 114 can comprise any number of actions that change one or more associated characteristics of the control system 108 and its constituent components 110. In various examples, an action can be defined for a predetermined time period, a specific set of components 110, and/or be directed to a specific operating condition 112.

As will be discussed further below, applying the action set 112 logically results in a changed set of states 104. Using an optimality function 116, the machine learning agent 102 can calculate an optimality score 118 that quantifies the success of a current iteration of the action set 114 as applied to the control system 108. Accordingly, the machine learning agent 102 can be configured to seek a maximum optimality score 118. As such, the machine learning agent 102 can determine a new iteration of the action set 114 that will lead to an increased optimality score 118 based on learnings from previous iterations of the action set 114.

In various examples, the optimality function can comprise several individual terms such as an optimization term 120 and an aging term 122. The optimization term 120 can be defined as a primary goal of the machine learning agent 102 for the control system 108. For example, the control system 108 may be for a manufacturing plant. Accordingly, the optimization term 120 may be configured as product throughput. In another example, the control system 108 can be for a cloud computing system. In this context, the optimization term 120 can be efficiency. It should be understood that the optimization term can be any aspect of the control system 108 and can be suited to the context in which the machine learning agent 102 and the control system 108 are deployed.

In addition, the machine learning agent 102 can derive an aging term 112 that quantifies the predictions of the aging model 106. In this way the information defined by the aging model 106 can be compatible with the optimality function 116. In some examples, the optimality function 116 can be referred to as a reward construct or an aging aware reward construct (AARC) and can be represented using the following equation:

$$R_{AARC} = \text{Max(optimization term)} \pm \text{aging term}$$

As mentioned above, the optimization term 120 can be the primary goal of the machine learning agent 102 and is thus what the machine learning agent 102 seeks to maximize through various iterations of the action set 114 (e.g., performance). Moreover, the aging term 122 can margin the calculation of the optimality score 118 by quantifying the impact of aging on the components 110 of the control system 108. While a specific example of an optimality function 116 is given above, it should be understood that the optimality function can be any mechanism for measuring the success of an action set 114. In addition, while the optimality score 118 can be a numerical score, any measure of optimality or figure of merit can be used to express the viability of an action set 114.

In one example, a non-aging aware solution may simply maximize the optimization term 120 extracted by a machine learning agent 102 and deem the approach optimal as the resultant optimality score 118 reaches a maximum. However, by margining the calculation of the optimality score 118, the disclosed system may discover that naively maximizing the optimization term 120 may lead to reduced optimality as the control system 108 and its components 110 degrade. Thus, the machine learning agent 102 that is equipped with aging awareness may instead take a more conservative approach to the optimization term 120 to prolong the lifespan of the control system 108 and the components 110.

Figure 1B:
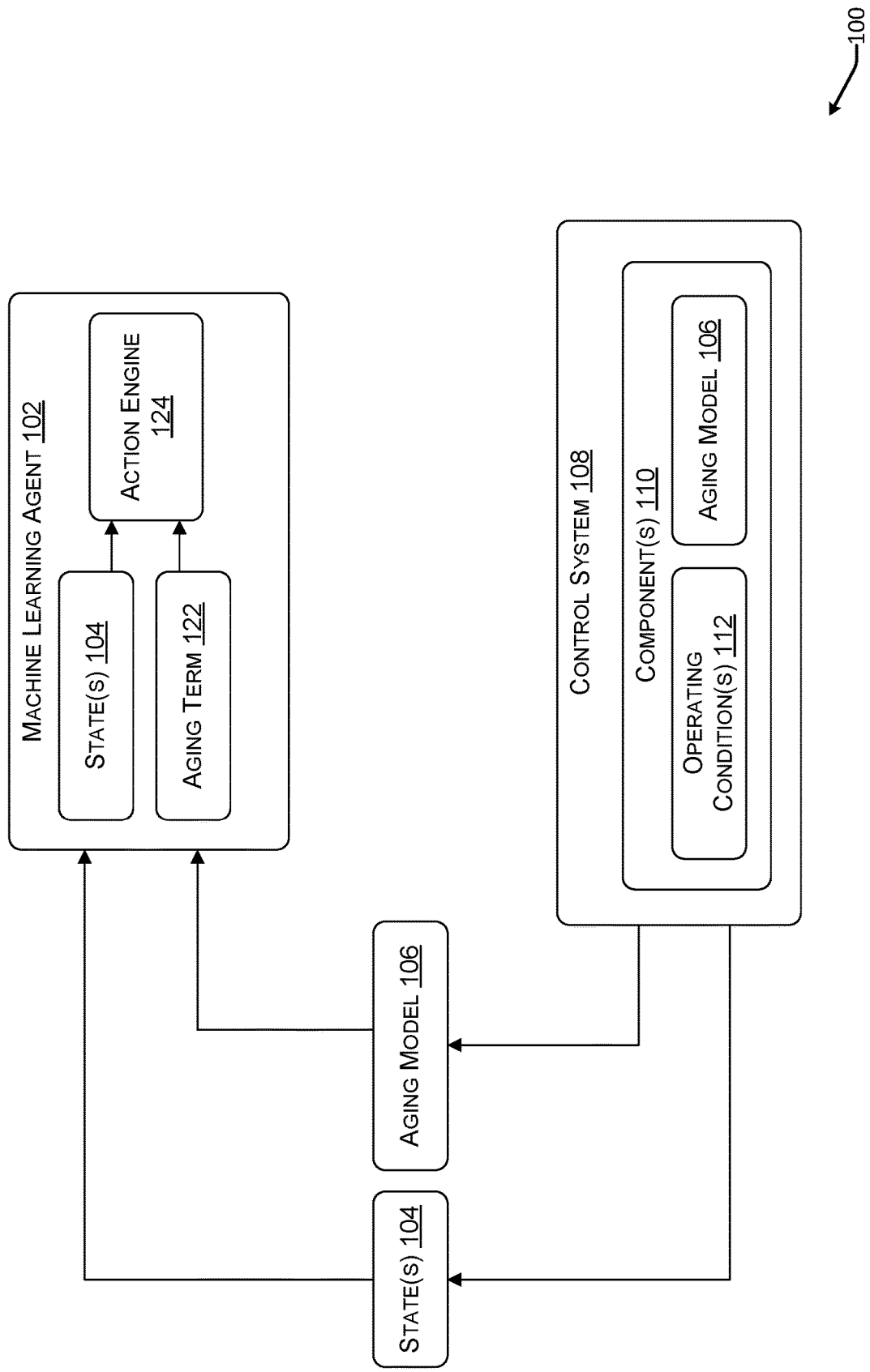
FIG. 1B shows the system for deploying an aging aware machine learning agent to manage a control system in a first phase of operation.

Turning now to FIG. 1B, a first phase of operation of the example system 100 is shown and described. As mentioned above, the machine learning agent 102 can extract a set of states 104 and an aging model 106 from the components 110 of the control system 108. Based on the aging model 106, the machine learning agent 102 can derive an aging term 122 to quantify the future operating conditions 112 predicted by the aging model 106. For the sake of discussion, it is helpful to consider the set of states as meters that collect and display readings pertaining to the control system. For example, an individual state 104 may relate to an individual associated operating condition 112 of a component 110 such as a fan speed or a temperature of a chiller, a flow rate of raw material in a manufacturing line, and so forth.

In some examples, the set of states 104 can be extracted over a period of time rather than for a particular point in time. For example, the machine learning agent 102 may require insight on larger scale trends in behaviors of the control system 108 that require additional collection of data. For example, a state 104 may relate to temperature trends in a climate control system over a time period of one week. Similarly, while a complete aging model 106 can be extracted from the control system 108, the aging term 122 derived from the aging model 106 can quantify predicted operating conditions 112 for a specific timeframe in the future. For example, while the aging model 106 may describe a degradation in efficiency over the full predicted lifespan of a component 110 (e.g., years or decades) the aging term 122 may quantify a portion of the aging model 106 for a different timescale. In one example, the aging term 122 can define operating conditions 122 for the control system 108 for one month in the future as defined by the aging model 106.

Figure 1C:
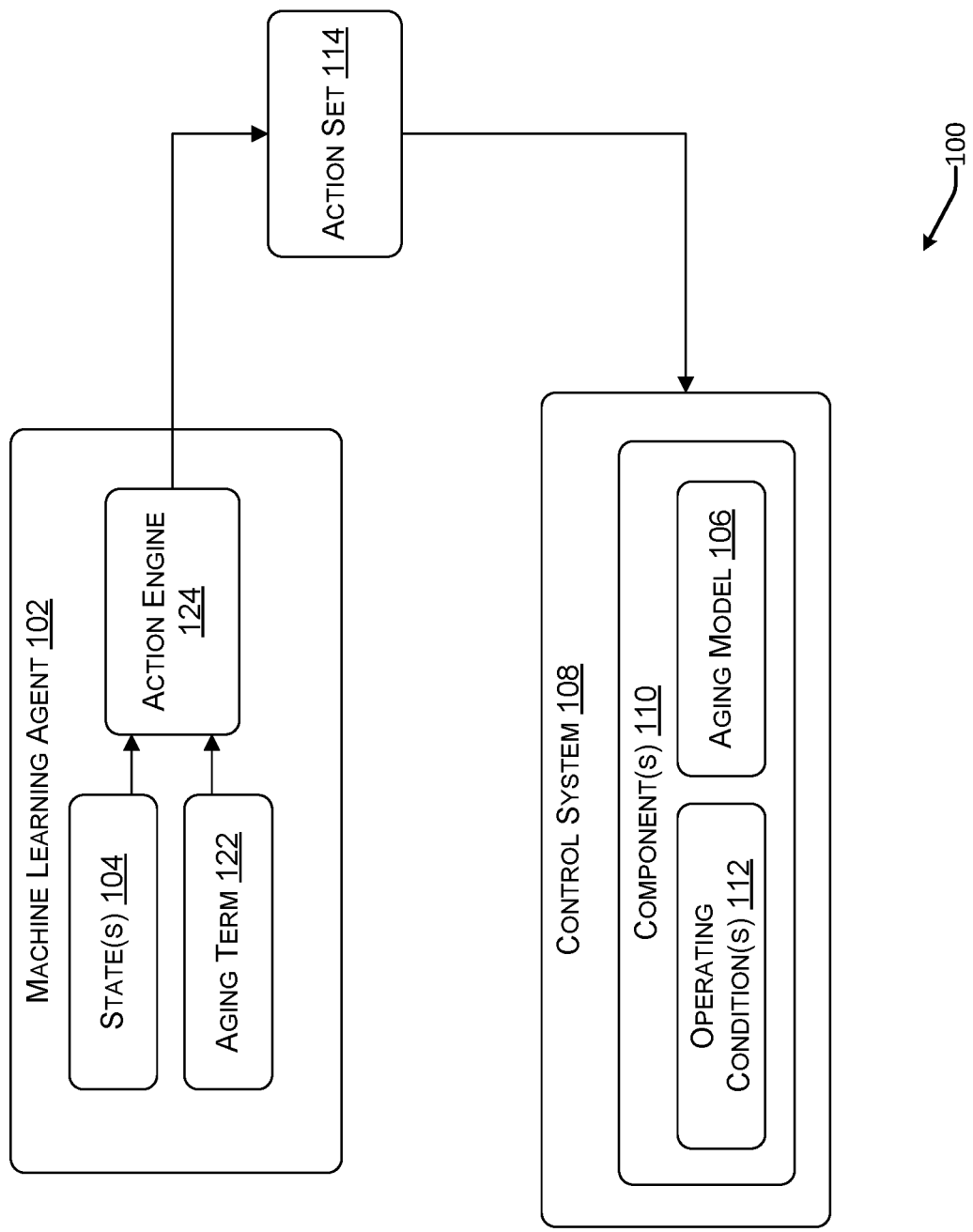
FIG. 1C shows the system for deploying an aging aware machine learning agent to manage a control system in a second phase of operation.

The set of states 104 and the aging term 122 can be received by an action engine 124 which can be a piece of the machine learning agent 102 that is responsible for determining the action set 114. In addition, for subsequent iterations of the action set 114, the action engine 124 may also include the optimality score 118 as will be shown and discussed below. As shown in FIG. 1C, the action set 114 can be applied to the control system 108 for modifying operating conditions 112 of the control system 108. In various examples, the action set 114 can directly modify the operating conditions 112 of the components 110 such as fan speed, flow rate, and others mentioned above.

Figure 1D:
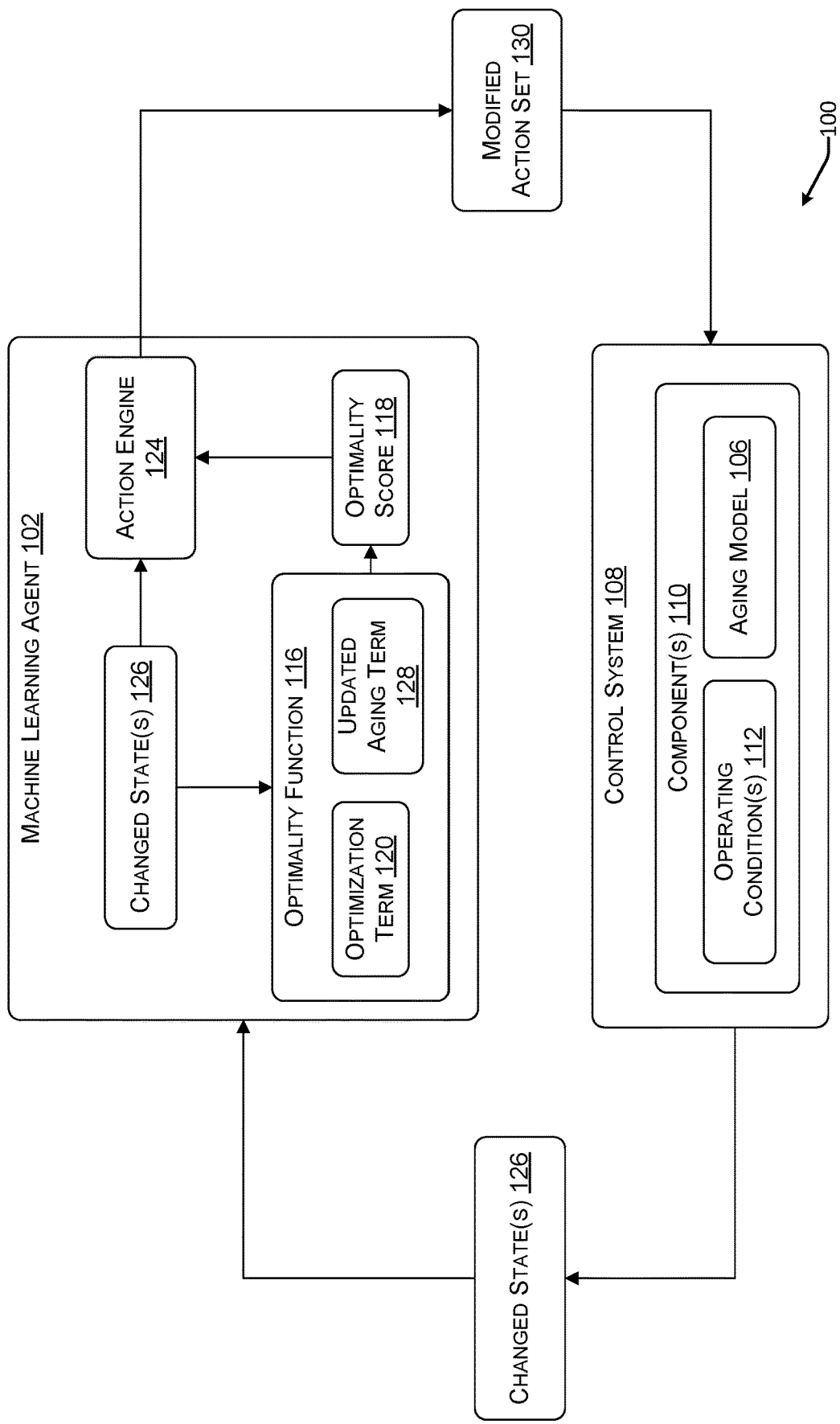
FIG. 1D shows the system for deploying an aging aware machine learning agent to manage a control system in a third phase of operation.

Turning now to FIG. 1D, additional aspects of the example system 100 are shown and described. As mentioned above, applying the action set 114 to the control system 108 can result in a set of changed states 126 that differ from the initial set of states 104 that was extracted from the control system 108. Accordingly, the changed states can be extracted from the control system 108 for analysis via the optimality function 116. The set of changed states 126 can be translated into the optimization term 120 through various methods. For example, if the optimization term 120 is concerned with a particular operating condition 112 of the control system 108, the state 126 that is associated with that operating condition 112 can simply be set as the optimization term 120 in the optimality function. In another example, if the optimization term 120 comprises several operating conditions 112, the various states 126 that are associated with those operating conditions 112 can be aggregated to generate the optimization term. Furthermore, the machine learning agent 108 may be equipped with weights that can prioritize certain states 126 over others when constructing the optimality function 116. In some examples, each state 126 can be assigned a numerical score that forms a portion of the optimization term 120. Accordingly, weights can be applied to each state 126 to emphasize or deemphasize the associated influence of that state 126 in the optimality function 116.

In addition, the machine learning agent 108 can provide an updated aging term 128 for the optimality function 116. As mentioned above, an aging term 122 can quantify aspects of the aging model 106 for a specific timeframe. As such, the aging term 122 can be replaced with the updated aging term 128 after a predetermined time period wherein the current aging term 122 has become irrelevant. In another example, the aging term 122 can be replaced with an updated aging term 128 for each new iteration of the action set 114. For example, while the aging term 122 may quantify operating conditions 112 for a first future timeframe, the updated aging term 128 can quantify operating conditions 112 for a second subsequent future timeframe. In this way, the updated aging term 128 can provide the most current information for the optimality function 116 to calculate the optimality score 118. The action engine 124 can subsequently receive the optimality score 118 as well as the set of changed states 126. Accordingly, the action engine 124 can determine a modified action set 130 based on the optimality score 118 and changed states 126 for application to the control system 108 and the constituent components 110 with the aim of increasing the optimality score 118 or other measures of optimality over many iterations of the modified action set 130.

Figure 2:
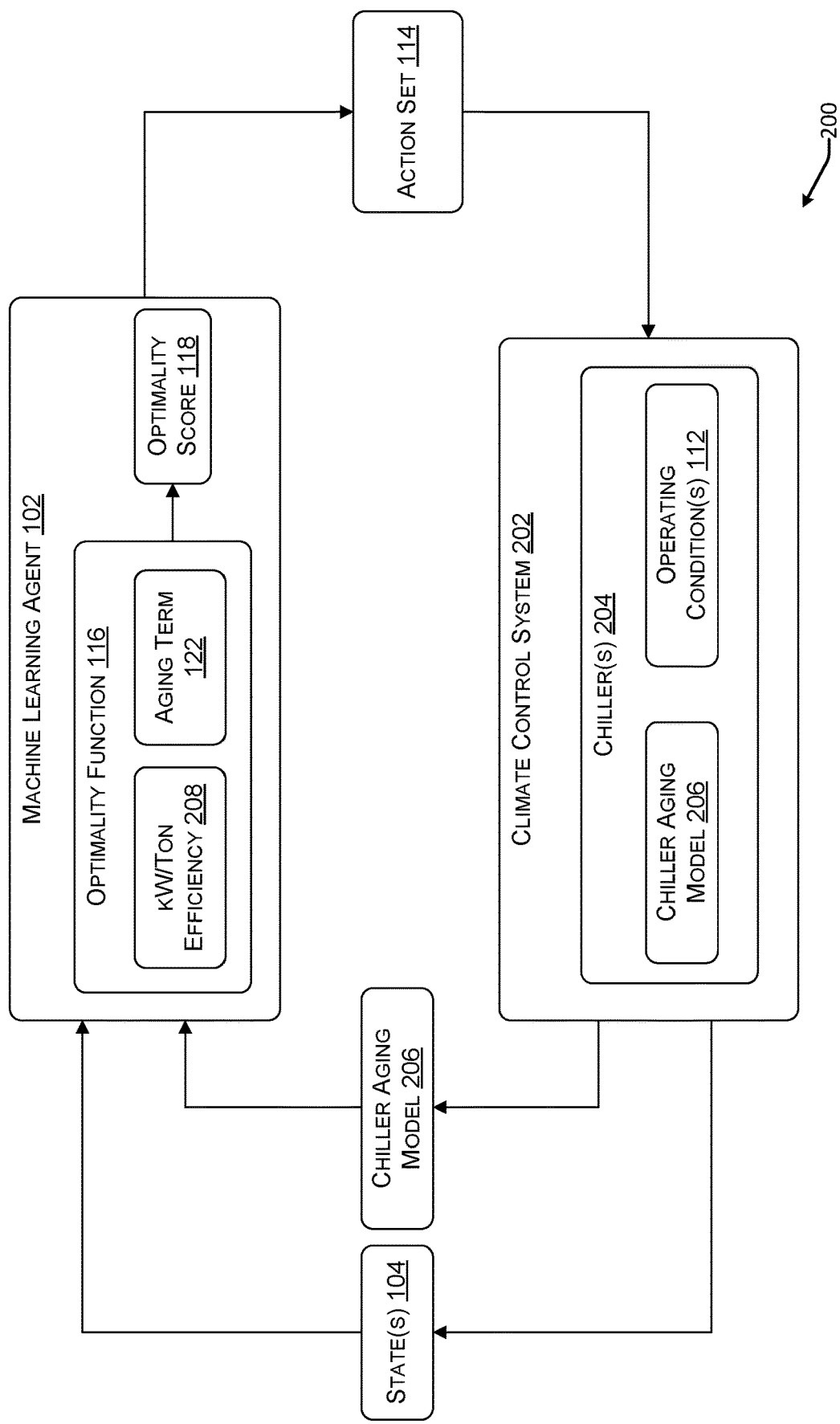
FIG. 2 is an example environment in which an aging aware machine learning agent is deployed to manage a climate control system.

Turning now to FIG. 2, aspects of an example system 200 implementing the principals of FIGS. 1A-1D in a specific context are shown and described. As shown in FIG. 2, the machine learning agent 102 can be deployed to manage a climate control system 202 such as a heating, ventilation, and air conditioning (HVAC) system for an office building. In particular, the machine learning agent 102 can control the chillers 204 for the climate control system 202. As chillers 204 tend to be among the costliest and energy intensive components of a climate control system 202, they are of particular concern for operators and represent a significant portion of operating costs.

As discussed above, the machine learning agent 102 can extract a set of states 104 from the climate control system 202 as well as a chiller aging model 206. The set of states can define current operation conditions 112 of the chillers while the chiller aging model 206 defines aging related drift or degradation of the chillers 204 over a certain period of time. From the chiller aging model 206, the machine learning agent 102 can derive an aging term 122 to inform decision-making regarding the action set 114. For example, the machine learning agent 102 may be configured to apply an action set 114 for one week before analyzing results and generating a new iteration of the action set 114. Thus, the aging term 122 can be derived that applies for the one-week period before a new iteration of the action set 114 is generated. Alternatively, the aging term 122 may quantify the chiller aging model 206 for a predetermined time period such as six months or a year. Thus, the aging term 122 may not updated for every iteration of the action set 114 and may only updated when the predetermined time period passes.

In the context of a climate control system 202, the machine learning agent 102 may be configured to optimize the chillers 204 for efficiency which can typically be measured as kilowatts per ton of cooling. Accordingly, the optimality function 116 can be constructed with a term relating to kW/ton efficiency 208 of the chillers 204 and the aging term 122. As discussed above, the optimization term 120 can be constructed from various operating conditions 112 of the control system 108. For the climate control system 202, the kW/ton efficiency 208 can be determined based on a first operating condition 112, the energy expenditure of the chillers 204 and a second operating condition 112, the amount of cooling the chillers 204 provide. This calculation in combination with the aging term 122 can enable the optimality function 116 to calculate an optimality score 118 for the action set 114.

As mentioned above, while both aging aware and non-aging aware solutions can realize gains in performance, efficiency, or other factors, the rate at which optimality is extracted from the control system 108 must also be augmented with consideration for component 110 degradation. For a climate control system 202, a non-aging aware solution may greedily extract the full kW/ton efficiency 208 from the chillers 204 at initial deployment (e.g., when a time t=0). However, while this can lead to highly efficient operation for a time, the non-aging aware approach gives no consideration to the degradation of the chillers 204 over time. Thus, the kW/ton efficiency of the chillers 204 may worsen over time naturally. In contrast, by taking into account the aging related degradation of the chillers 204 and adjusting the setpoint accordingly, the machine learning agent 102 can maintain excellent efficiency for an extended period of time. While the efficiency extracted by the aging-aware machine learning agent 102 may not be the maximum possible efficiency, the climate control system 202 and the chillers 204 may realize a prolonged lifespan. In this way, operating costs can be reduced in the long term while other activities such as regular maintenance schedules can be well defined to minimize downtime.

Figure 3:
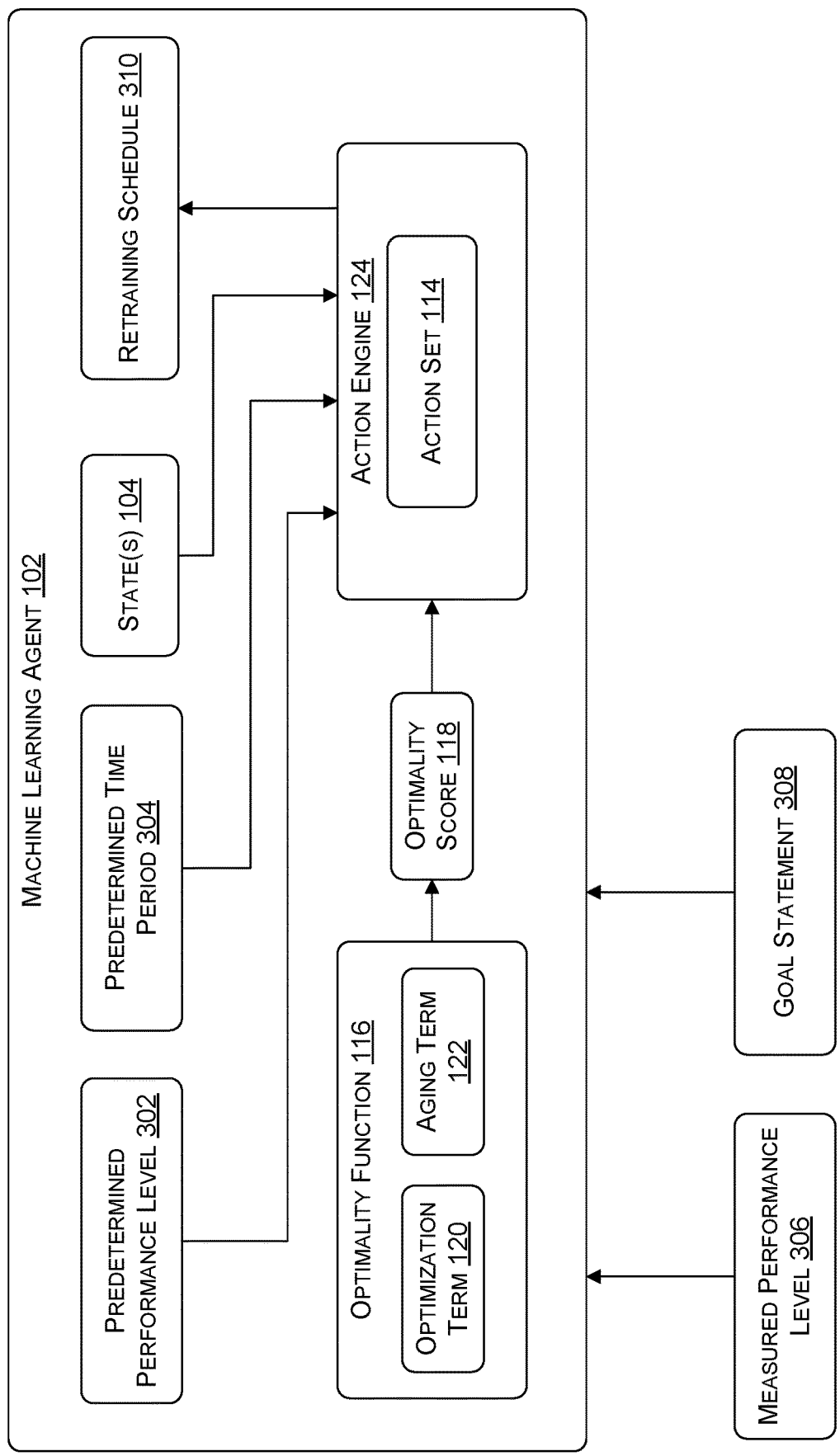
FIG. 3 is a block diagram showing various aspects of the aging aware machine learning agent.

Turning now to FIG. 3, additional aspects of the machine learning agent 102 are shown and described. As described above, the machine learning agent can utilize an action engine 124 to generate an action set 114 based on a set of states 104 as well as an optimality score 118. The optimality score 118 can be calculated by an optimality function 116 that accounts for both the main goal of the machine learning agent 102 through the optimization term 120 and the effects of aging on the control system 108 through the aging term 122. Through many iterations of the action set 114, the machine learning agent 102 can uncover a realistically optimal action set 114 that effectively balances the optimization term 120 and the aging term 122.

In addition, the machine learning agent 102 can be configured to receive a predetermined performance level 302 from an administrative entity. The administrative entity can be a system administrator, an engineer, or other entity that can direct the machine learning agent 102. In various examples, the predetermined performance level 302 can define a specific state 104 or operating condition 112 of interest. For example, in the example system 200 described above, the predetermined performance level 302 can be a specific value of kW/ton efficiency 208 of the climate control system 202 that the administrative entity desires.

Similarly, the machine learning agent 102 can receive a predetermined time period 304 during which the control system 108 must maintain the predetermined performance level 302. For instance, continuing with the climate control system 202 example, the administrative entity may specify that the climate control system 202 must maintain a kW/ton efficiency 208 of 0.8 for six months. In this example, the predetermined performance level 302 is 0.8 kW/ton while the predetermined time period 304 is six months. Accordingly, the predetermined performance level 302 and the predetermined time period 304 can be provided to the action engine 124. In addition, the machine learning agent 102 can receive a measured performance level 306 from the control system 108 to ensure that the action set 114 conforms to the predetermined performance level 302. In this way, the action engine 124 can tailor the action set 114 to specific constraints provided by the administrative entity.

Furthermore, the machine learning agent 102 can be configured to receive a goal statement 308 from the administrative entity that can define various goals for the machine learning agent 102 in a natural language format. In example, an administrative entity may provide a goal statement 306 that instructs the machine learning agent 102 to "increase operating efficiency with minimal impact on equipment aging." In response, the machine learning agent 102 can parse the goal statement 306 for specific terms such as "operating efficiency" and "minimal impact on equipment aging" to derive various terms and construct the optimality function 116. In this example, the machine learning agent 102 may determine "operating efficiency" as the optimization term 120 with "minimal impact" as the aging term 122. In other examples, the goal statement 306 can be provided in other formats such as through speech, text, a graphical user interface, or other low code methods that enable an administrative entity that lacks technical expertise to configure the machine learning agent 102.

Moreover, as mentioned briefly above, the machine learning agent 102 may require periodic retraining as defined by a retraining schedule 310. In various examples, the predictive accuracy of the machine learning agent 102 can degrade over time due to changing conditions and/or data that differ from an initial training dataset. This phenomenon is often referred to as model drift. Retraining can enable the machine learning agent 102 to adapt to changing conditions and eliminate model drift. Periodic retraining of the machine learning agent 102 can ensure that the machine learning agent 102 is performing nominally at all times. By integrating aging awareness, the machine learning agent 102 can be configured to adjust the retraining schedule 310 to synchronize with a maintenance schedule of the control system 108. In this way, the machine learning agent 102 can minimize downtime associated with regular maintenance activities as retraining can occur while the control system 108 is taken offline for preventative maintenance.

Figure 4:
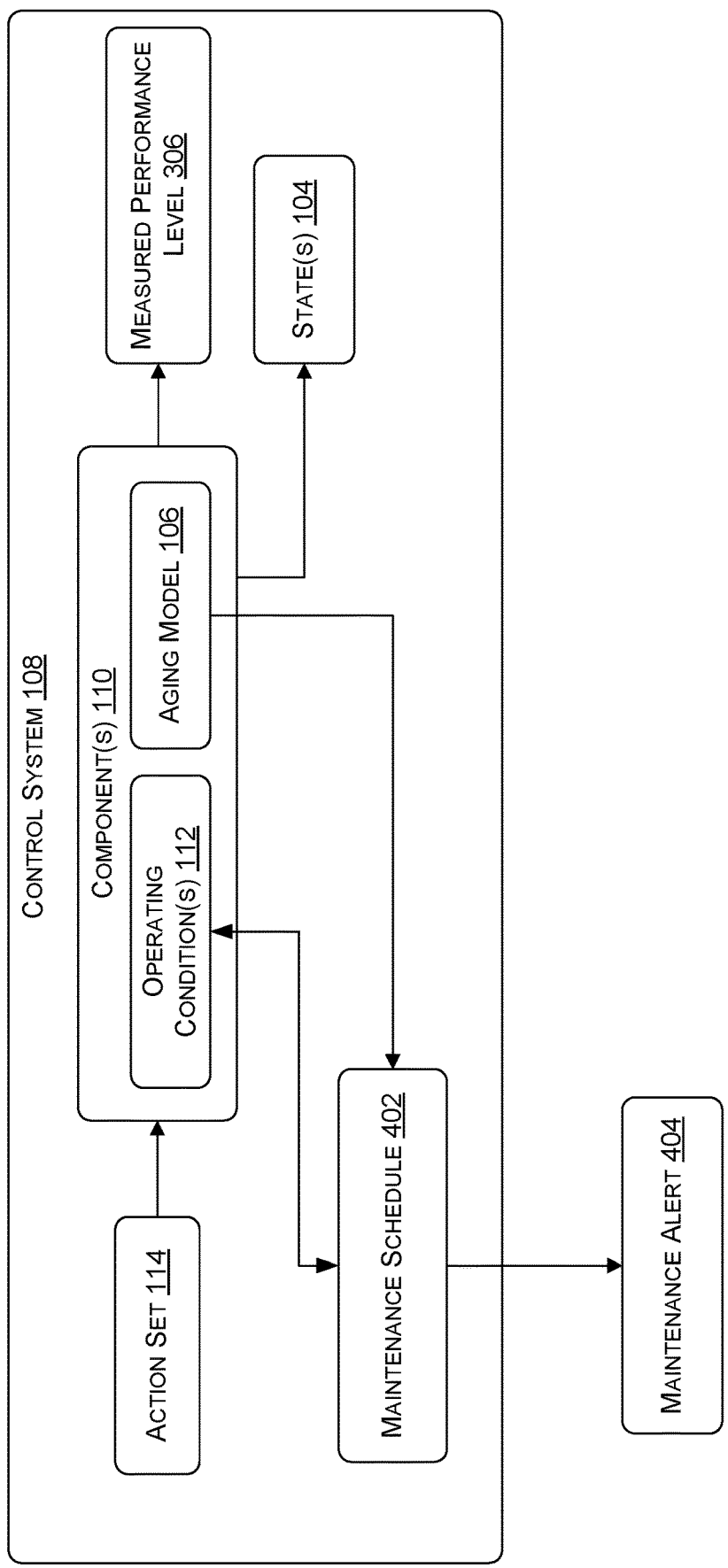
FIG. 4 is a block diagram showing various aspects of a control system augmented by the aging aware machine learning agent.

Turning now to FIG. 4, aspects of the control system 108 are shown and described. As described above, the control system 108 can comprise various components 110 that are controlled by the machine learning agent 102 via an action set 114. The action set 114 can directly or indirectly modify the operating conditions 112 of the components 110. For example, the action set 114 may modify the setpoint for a chiller 204 of a climate control system 202. Furthermore, the operating conditions 112 as well as the aging model 106 can inform the maintenance schedule 402. For example, while the aging model 106 may provide a well-defined prediction for the performance degradation of the components 110, the operating conditions 112 can augment the rate or manner in which the components 110 degrade. For example, the aging model 106 may assume nominal load on the control system 108. However, during a period of heavy load as indicated by the operating conditions 112, the components 110 may experience accelerated degradation that can be inconsistent with the aging model 106. In this way, the maintenance schedule 402 must be tailored to the specific needs of the control system 108 and the components 110.

In various examples, the maintenance schedule 402 can define a period of time during which the control system 108 is taken offline for inspection and maintenance (e.g., once annually). Alternatively, the maintenance schedule 402 can be configured to monitor the control system 108 through the operating conditions 112, the measure performance level 306, and the like. If one or more operating conditions 112, measure performance level 306, or other metrics reach a threshold value, the maintenance schedule 402 can be enabled to generate a maintenance alert 404. In this way, the control system 108 can enable predictive maintenance to preempt potential issues far in advance. This dynamic maintenance schedule 402 can be achieved via various computing techniques or the machine learning agent 102. In addition, the maintenance schedule 402 can be generated automatically based on the aging model 106 and the operating conditions 112. Alternatively, the maintenance schedule 402 can be manually set by an administrative entity such as a system engineer, technician, and the like.

As mentioned above, the machine learning agent 102 can be configured to receive the maintenance schedule 402 to synchronize the retraining schedule 310 with the maintenance schedule 402. In various examples, the maintenance schedule 402 can be extracted alongside the aging model 106 to enable the machine learning agent 102 to predict future behaviors of the control system 108. In addition, the machine learning agent 102 can be configured to modify the maintenance schedule 402 based on various factors such as the states 104, the measured performance level 306, the operating conditions 112, and so forth. For example, the machine learning agent 102 may receive a predetermined performance level 302 that results in reduced strain on the components 110. In this example, the maintenance schedule 402 may specify maintenance is to occur once every six months. However, due to the updated operating conditions 112, the machine learning agent 102 may determine that maintenance may not be required until one year from the present timeframe. Accordingly, the maintenance schedule 402 can be modified to reflect this updated assessment of component 110 degradation.

Figure 5:
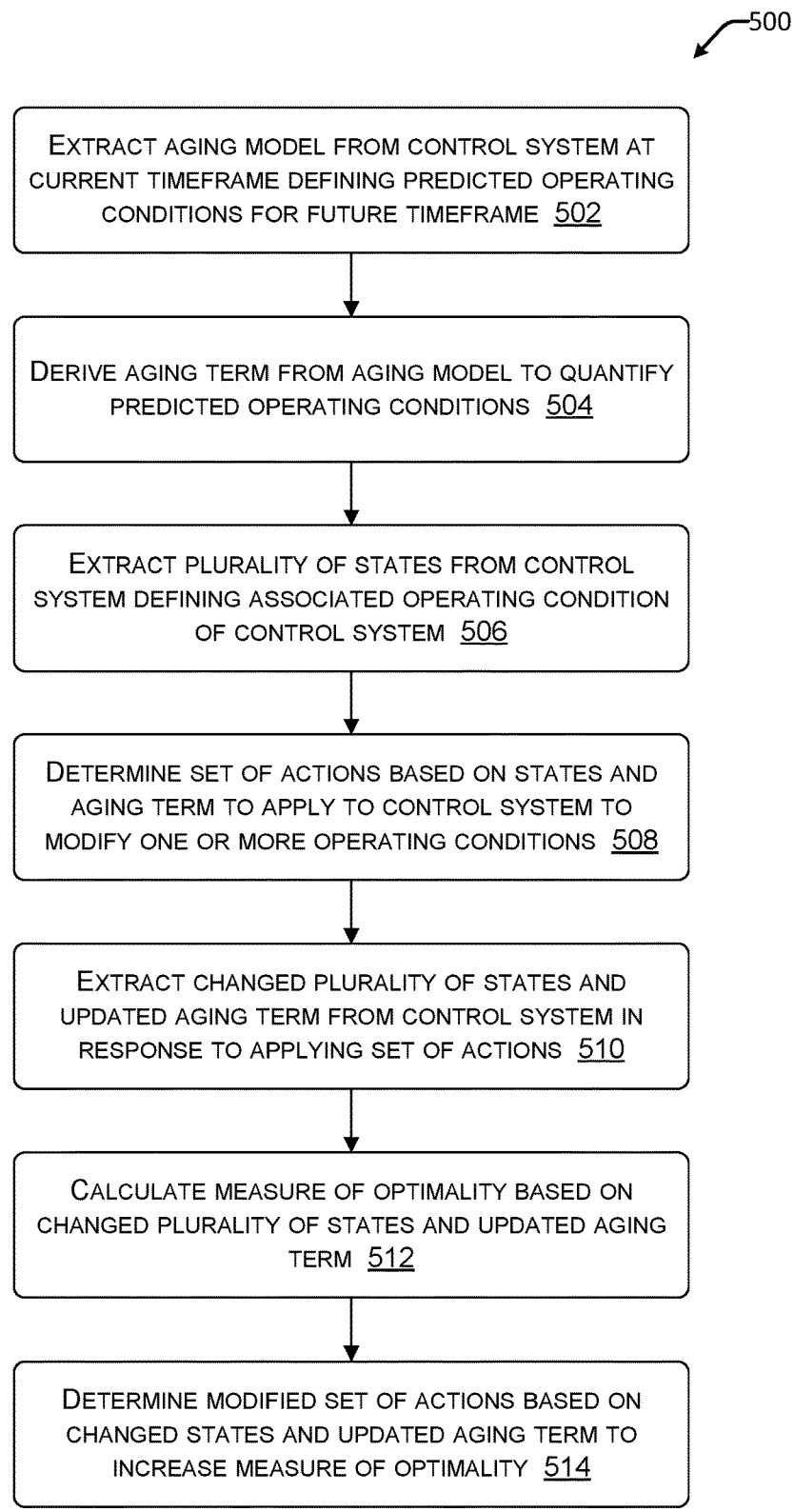
FIG. 5 is a flow diagram showing aspects of a routine for deploying an aging aware machine learning agent for managing control systems.

Turning now to FIG. 5, aspects of a routine 500 for enabling aging aware training of machine learning agents for control systems are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, routine 500 begins at operation 502 where a machine learning agent 102 extracts an aging model 106 from a control system 108 at a current timeframe (e.g., the present). As mentioned above, the aging model 106 can define operating conditions 112 for a future timeframe. In various examples, the aging model 106 can be a statistical model that mathematically represents degradation or drift in the functionality of components 110 of the control system 108.

Next, at operation 504 the system derives an aging term 122 from the aging model 106 that quantifies the predicted operating conditions 112 for the future timeframe. As discussed above, the aging term 122 can quantify all or a portion of the aging model 106.

Then, at operation 506, the system extracts a plurality of states 104 from the control system 108 that define associated operating conditions 112 of the control system 108. In one example, a state 104 can relate to a fan speed of a particular component 110 or a setpoint for a chiller 204.

Subsequently, at operation 508, the machine learning agent 102 analyzes the set of states 104 and the aging term 122 to determine a set of actions 114 that are applied to the control system 108 to modify one or more operating conditions 112 of the components 110. In various examples, the action set 114 can modify operating conditions 112 that are defined by the states 104. For instance, the fan speed of a component 110 that is measured by a state 104 can be adjusted by a corresponding action 114.

Then, at operation 510, the machine learning agent 102 extracts a changed plurality of states 126 and an updated aging term 128 that result from applying the set of actions 114. The changed states 126 can define operating conditions 112 that were directly or indirectly affected by the action set 114. For example, an action 114 may increase a fan speed of a component 110 that results in a lower operating temperature for a different component 110.

Next, at operation 512, the machine learning agent 102 calculates a measure of optimality 118 for the set of actions 114 based on the changed plurality of states 126 and the updated aging term 128. In various examples, the measure of optimality 118 can be a numerical score that is calculated using an optimality function 116 that includes an optimization term 120 and an aging term 122. However, it should be understood that the measure of optimality 118 can be expressed using any suitable format.

Finally, at operation 514, the machine learning agent 102 determines a modified set of actions 130 based on the changed plurality of states 126 and the updated aging term 128. The modified set of actions 130 is then applied to the control system 108 to further modify the operating conditions 112 with the aim of increasing the measure of optimality 118.

Figure 6:
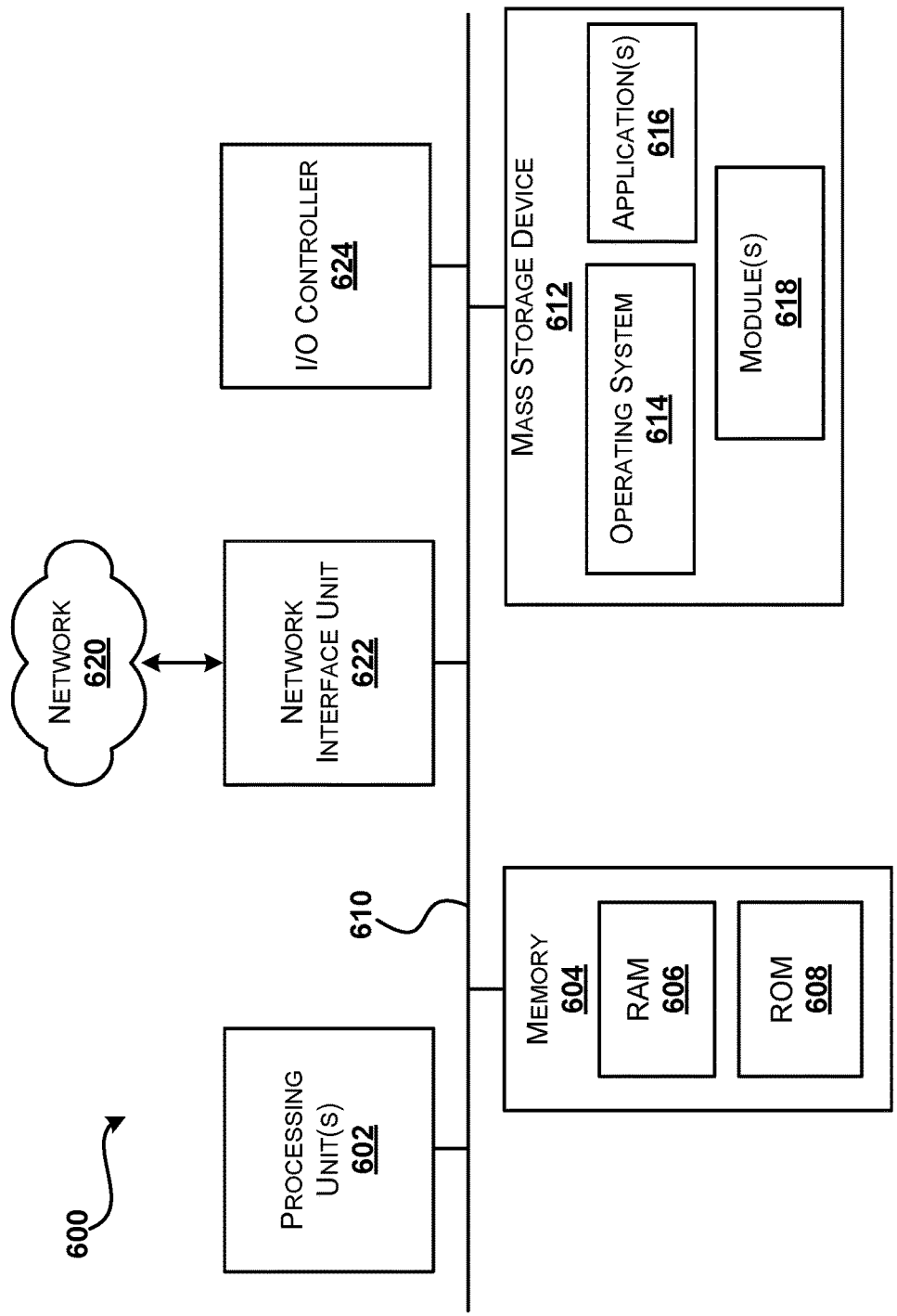
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (AS SPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media and non-transitory computer-readable storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 702 transition between states, thereby transforming the transistors or other discrete hardware elements constituting the processing unit(s) 602.

Figure 7:
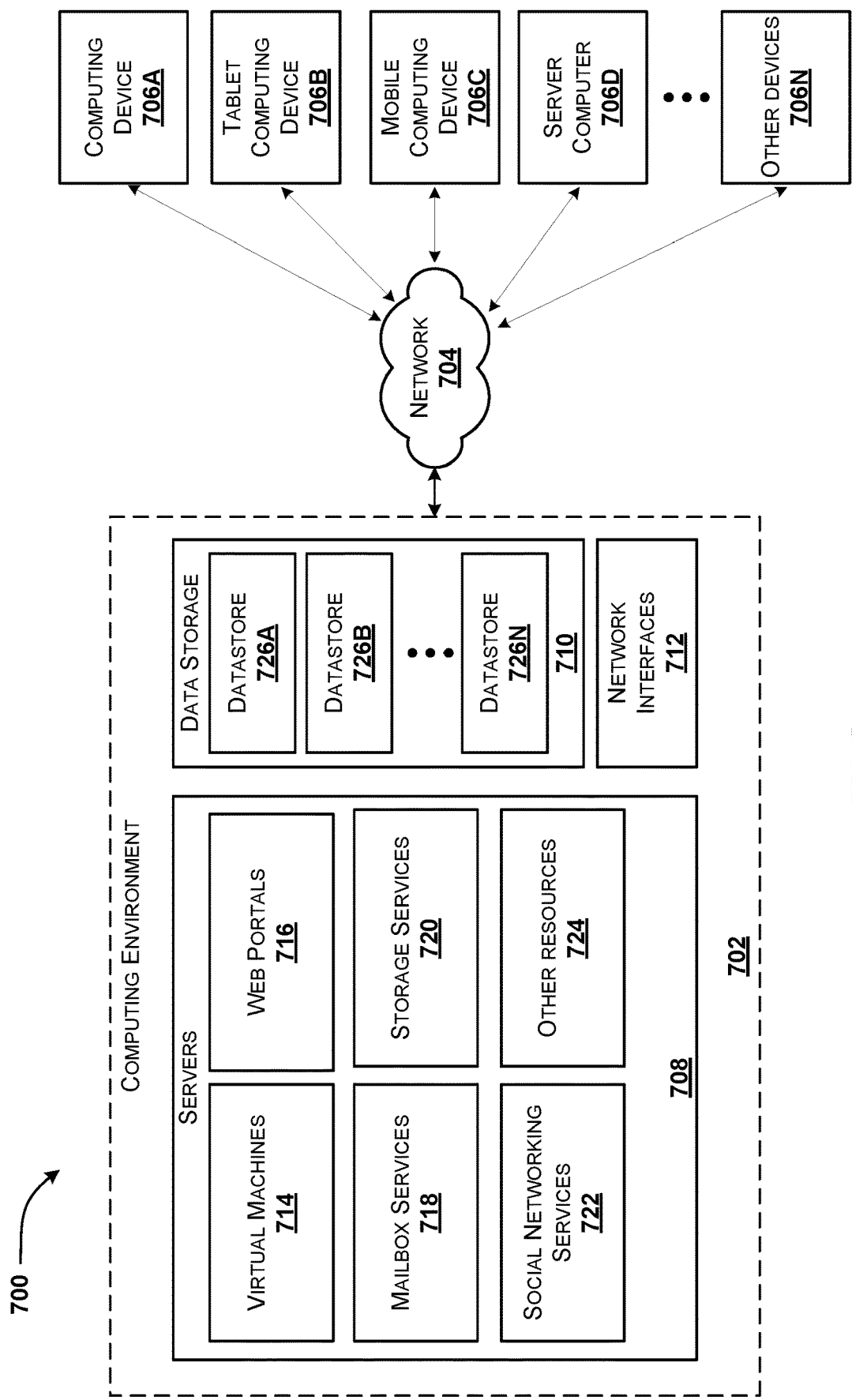
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: extracting, by one or more processing units at a current timeframe, an aging model from a control system managed by a machine learning agent, the aging model defining one or more predicted operating conditions of the control system for a future timeframe; deriving an aging term from the aging model for quantifying the one or more predicted operating conditions for the future timeframe; extracting, by the machine learning agent, a plurality of states from the control system defining a plurality of associated operating conditions of the control system; determining a set of one or more actions based on the plurality of states and the aging term for application to the control system 108 at the current timeframe to modify the one or more operating conditions of the control system; extracting a changed plurality of states and an updated aging term from the control system in response to applying the one or more actions to the control system; calculating a measure of optimality for the set of one or more actions based on the changed plurality of states and the updated aging term; and determining a modified set of one or more actions based on the changed plurality of states and the updated aging term for application to the control system at the future timeframe to modify the one or more operating conditions of the control system and increase the measure of optimality.

Example Clause B, the method of Example Clause A, wherein the measure of optimality is calculated using an optimality function comprising an optimization term and the aging term.

Example Clause C, the method of Example Clause A or Example Clause B, wherein the control system controls one or more devices of a climate control system.

Example Clause D, the method of any one of Example Clause A through C, wherein the aging model is a statistical model defining a degradation in functionality of the control system for a predefined future time period.

Example Clause E, the method of any one of Example Clause A through D, further comprising: receiving a goal statement from an administrative entity comprising one or more objectives for the control system in a natural language format; and parsing the goal statement for the one or more objectives to construct an optimality function comprising one or more terms representing the one or more objectives and the aging term.

Example Clause F, the method of any one of Example Clause A through E, further comprising: receiving a predetermined performance level of the control system from an administrative entity; and generating an updated set of one or more actions based on the predetermined performance level such that a measured performance level of the control system matches the predetermined performance level.

Example Clause G, the method of any one of Example Clause A through F, further comprising: receiving a maintenance schedule for the control system from an administrative entity defining a period of time during which the control system is disabled; and in response to receiving the maintenance schedule, generating a retraining schedule of the machine learning agent that synchronizes with the maintenance schedule defining a period of time during which the machine learning agent is disabled.

Example Clause H, a system comprising: one or more processing units; and a computer-readable medium having encoded thereon computer-executable instructions to cause the one or more processing units to: extract, by one or more processing units at a current timeframe, an aging model from a control system managed by a machine learning agent, the aging model defining one or more predicted operating conditions of the control system for a future timeframe; derive an aging term from the aging model for quantifying the one or more predicted operating conditions for the future timeframe; extract, by the machine learning agent, a plurality of states from the control system defining a plurality of associated operating conditions of the control system; determine a set of one or more actions based on the plurality of states and the aging term for application to the control system at the current timeframe to modify the one or more operating conditions of the control system; extract a changed plurality of states and an updated aging term from the control system in response to applying the one or more actions to the control system; calculate a measure of optimality for the set of one or more actions based on the changed plurality of states and the updated aging term; and determine a modified set of one or more actions based on the changed plurality of states and the updated aging term for application to the control system at the future timeframe to modify the one or more operating conditions of the control system and increase the measure of optimality.

Example Clause I, the system of Example Clause H, wherein the measure of optimality is calculated using an optimality function comprising an optimization term and the aging term.

Example Clause J, the system of Example Clause H or Example Clause I, wherein the control system controls one or more devices of a climate control system.

Example Clause K, the system of any one of Example Clause H through J, wherein the aging model is a statistical model defining a degradation in functionality of the control system for a predefined future time period.

Example Clause L, the system of any one of Example Clause H through K, wherein the computer-executable instructions further cause the one or more processing units to: receive a goal statement from an administrative entity comprising one or more objectives for the control system in a natural language format; and parse the goal statement for the one or more objectives to construct an optimality function comprising one or more terms representing the one or more objectives and the aging term.

Example Clause M, the system of any one of Example Clause H through L, wherein the computer-executable instructions further cause the one or more processing units to: receive a predetermined performance level of the control system from an administrative entity; and generate an updated set of one or more actions based on the predetermined performance level such that a measured performance level of the control system matches the predetermined performance level.

Example Clause N, the system of any one of Example Clause H through M, wherein the computer-executable instructions further cause the one or more processing units to: receive a maintenance schedule for the control system from an administrative entity defining a period of time during which the control system is disabled; and in response to receiving the maintenance schedule, generate a retraining schedule of the machine learning agent that synchronizes with the maintenance schedule defining a period of time during which the machine learning agent is disabled.

Example Clause O, a computer-readable storage medium having encoded thereon computer-executable instructions to cause a system to: extract, by one or more processing units at a current timeframe, an aging model from a control system managed by a machine learning agent, the aging model defining one or more predicted operating conditions of the control system for a future timeframe; derive an aging term from the aging model for quantifying the one or more predicted operating conditions for the future timeframe; extract, by the machine learning agent, a plurality of states from the control system defining a plurality of associated operating conditions of the control system; determine a set of one or more actions based on the plurality of states and the aging term for application to the control system at the current timeframe to modify the one or more operating conditions of the control system; extract a changed plurality of states and an updated aging term from the control system in response to applying the one or more actions to the control system; calculate a measure of optimality for the set of one or more actions based on the changed plurality of states and the updated aging term; and determine a modified set of one or more actions based on the changed plurality of states and the updated aging term for application to the control system at the future timeframe to modify the one or more operating conditions of the control system and increase the measure of optimality.

Example Clause P, the computer-readable storage medium of Example Clause O, wherein the measure of optimality is calculated using an optimality function comprising an optimization term and the aging term.

Example Clause Q, the computer-readable storage medium of Example Clause O or Example Clause P, wherein the aging model is a statistical model defining a degradation in functionality of the control system for a predefined future time period.

Example Clause R, the computer-readable storage medium of any one of Example Clause O through Q, Example Clause S, the computer-readable storage medium of any one of Example Clause O through R, wherein the computer-executable instructions further cause the system to: receive a goal statement from an administrative entity comprising one or more objectives for the control system in a natural language format; and parse the goal statement for the one or more objectives to construct an optimality function comprising one or more terms representing the one or more objectives and the aging term.

Example Clause T, the computer-readable storage medium of any one of Example Clause O through S, wherein the computer-executable instructions further cause the system to: receive a maintenance schedule for the control system from an administrative entity defining a period of time during which the control system is disabled; and in response to receiving the maintenance schedule, generate a retraining schedule of the machine learning agent that synchronizes with the maintenance schedule defining a period of time during which the machine learning agent is disabled.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different states).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   extracting, by one or more processing units at a current timeframe, an aging model from a control system managed by a machine learning agent, the aging model defining one or more predicted operating conditions of the control system for a future timeframe;
   deriving an aging term from the aging model for quantifying the one or more predicted operating conditions for the future timeframe;
   extracting, by the machine learning agent, a plurality of states from the control system defining a plurality of associated operating conditions of the control system;
   receiving a goal statement from an administrative entity, the goal statement comprising one or more objectives for the control system in a natural language format;
   parsing the goal statement for the one or more objectives to construct an optimality function comprising one or more terms representing the one or more objectives and the aging term;
   determining one or more actions based on the plurality of states and the aging term for application to the control system at the current timeframe to modify the one or more operating conditions of the control system;
   extracting a changed plurality of states and an updated aging term from the control system in response to applying the one or more actions to the control system;
   calculating, by the optimality function, a measure of optimality for the one or more actions based on the changed plurality of states and the updated aging term; and
   determining of one or more updated actions based on the changed plurality of states and the updated aging term for application to the control system at the future timeframe to modify the one or more operating conditions of the control system and increase the measure of optimality.

2. The method of claim 1, wherein the optimality function further comprises an optimization term.

3. The method of claim 1, wherein the control system controls one or more devices of a climate control system.

4. The method of claim 1, wherein the aging model is a statistical model defining a degradation in functionality of the control system for a predefined future time period.

5. The method of claim 1, further comprising:
   receiving a predetermined performance level of the control system from an administrative entity; and
   modifying the one or more updated actions based on the predetermined performance level such that a measured performance level of the control system matches the predetermined performance level.

6. The method of claim 1, further comprising:
   receiving a maintenance schedule for the control system from an administrative entity defining a period of time during which the control system is disabled; and
   in response to receiving the maintenance schedule, generating a retraining schedule of the machine learning agent that synchronizes with the maintenance schedule defining a period of time during which the machine learning agent is disabled.

7. A system comprising:
   one or more processing units; and
   a computer-readable medium having encoded thereon computer-executable instructions to cause the one or more processing units to:
      extract, by one or more processing units at a current timeframe, an aging model from a control system managed by a machine learning agent, the aging model defining one or more predicted operating conditions of the control system for a future timeframe;
      derive an aging term from the aging model for quantifying the one or more predicted operating conditions for the future timeframe;
      extract, by the machine learning agent, a plurality of states from the control system defining a plurality of associated operating conditions of the control system;
      receive a predetermined performance level of the control system from an administrative entity;
      determine one or more actions based on the plurality of states, the aging term, and the predetermined performance level for application to the control system at the current timeframe to modify the one or more operating conditions of the control system;
      extract a changed plurality of states and an updated aging term from the control system in response to applying the one or more actions to the control system;
      calculate a measure of optimality for the one or more actions based on the changed plurality of states and the updated aging term; and
      determine one or more updated actions based on the changed plurality of states and the updated aging term for application to the control system at the future timeframe to modify the one or more operating conditions of the control system to increase the measure of optimality and to modify a measured performance level of the control system such that the measured performance level matches the predetermined performance level.

8. The system of claim 7, wherein the measure of optimality is calculated using an optimality function comprising an optimization term and the updated aging term.

9. The system of claim 7, wherein the control system controls one or more devices of a climate control system.

10. The system of claim 7, wherein the aging model is a statistical model defining a degradation in functionality of the control system for a predefined future time period.

11. The system of claim 7, wherein the computer-executable instructions further cause the one or more processing units to:
receive a goal statement from an administrative entity comprising one or more objectives for the control system in a natural language format; and
parse the goal statement for the one or more objectives to construct an optimality function comprising one or more terms representing the one or more objectives and the updated aging term.

12. The system of claim 7, wherein the computer-executable instructions further cause the one or more processing units to:
receive a maintenance schedule for the control system from an administrative entity defining a period of time during which the control system is disabled; and
in response to receiving the maintenance schedule, generate a retraining schedule of the machine learning agent that synchronizes with the maintenance schedule defining a period of time during which the machine learning agent is disabled.

13. A computer-readable storage medium having encoded thereon computer-executable instructions to cause a system to:
extract, by one or more processing units at a current timeframe, an aging model from a control system managed by a machine learning agent, the aging model defining one or more predicted operating conditions of the control system for a future timeframe;
derive an aging term from the aging model for quantifying the one or more predicted operating conditions for the future timeframe;
extract, by the machine learning agent, a plurality of states from the control system defining a plurality of associated operating conditions of the control system;
receive a maintenance schedule for the control system from an administrative entity defining a period of time during which the control system is disabled; and
in response to receiving the maintenance schedule, generate a retraining schedule of the machine learning agent that synchronizes with the maintenance schedule, the retraining schedule defining a period of time during which the machine learning agent is disabled;
determine one or more actions based on the plurality of states, the aging term, and the retraining schedule for application to the control system at the current timeframe to modify the one or more operating conditions of the control system;
extract a changed plurality of states and an updated aging term from the control system in response to applying the one or more actions to the control system;
calculate a measure of optimality for of one or more actions based on the changed plurality of states and the updated aging term; and
determine of one or more updated actions based on the changed plurality of states and the updated aging term for application to the control system at the future timeframe to modify the one or more operating conditions of the control system and increase the measure of optimality.

14. The computer-readable storage medium of claim 13, wherein the measure of optimality is calculated using an optimality function comprising an optimization term and the updated aging term.

15. The computer-readable storage medium of claim 13, wherein the aging model is a statistical model defining a degradation in functionality of the control system for a predefined future time period.

16. The computer-readable storage medium of claim 13, wherein the computer-executable instructions further cause the system to:
receive a goal statement from an administrative entity comprising one or more objectives for the control system in a natural language format; and
parse the goal statement for the one or more objectives to construct an optimality function comprising one or more terms representing the one or more objectives and the updated aging term.

17. The computer-readable storage medium of claim 13, wherein the computer-executable instructions further cause the system to:
receive a predetermined performance level of the control system from an administrative entity; and
of modify the one or more updated actions based on the predetermined performance level such that a measured performance level of the control system matches the predetermined performance level.

* * * * *